INVENTOR.
Irving S. Houvener

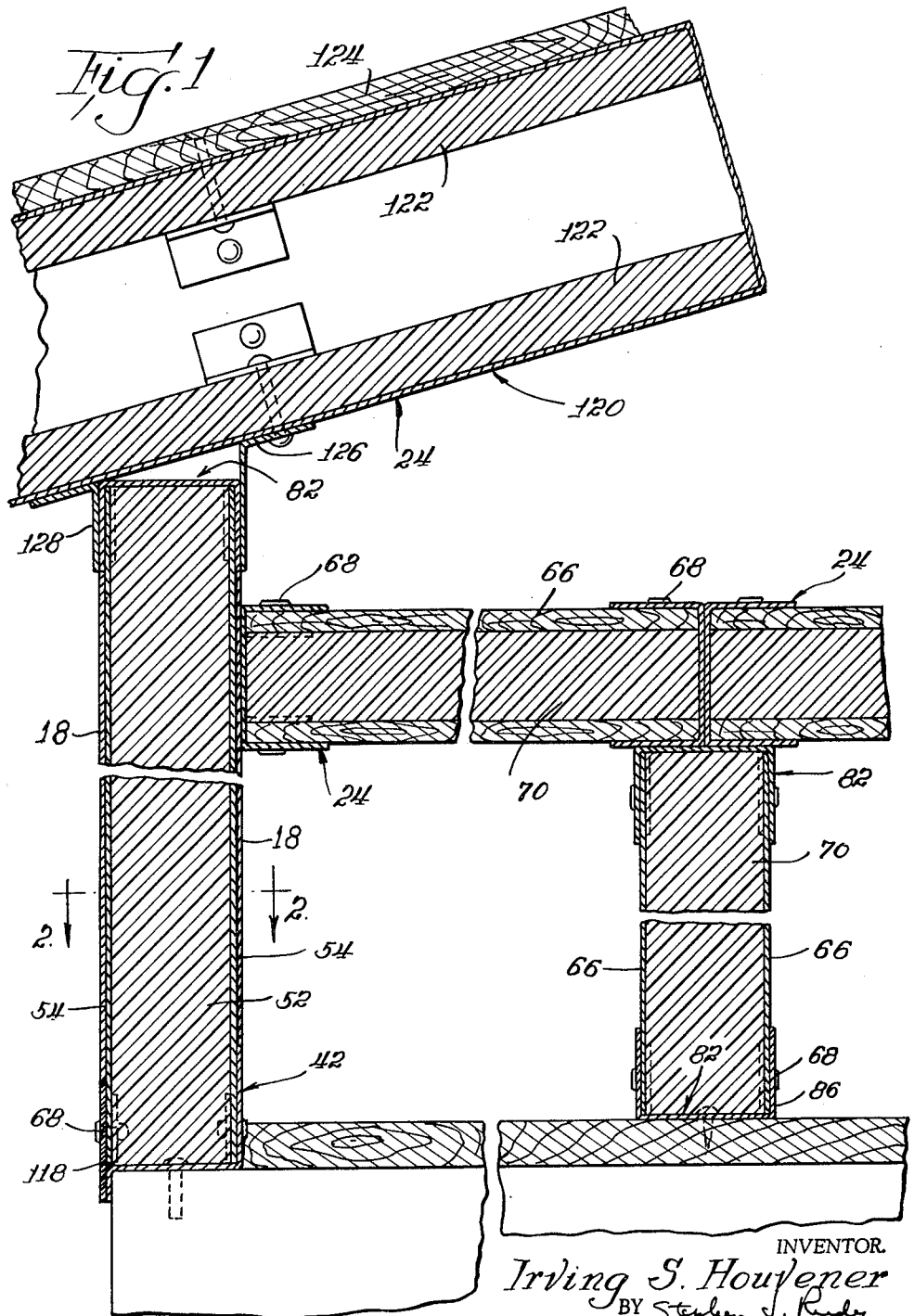

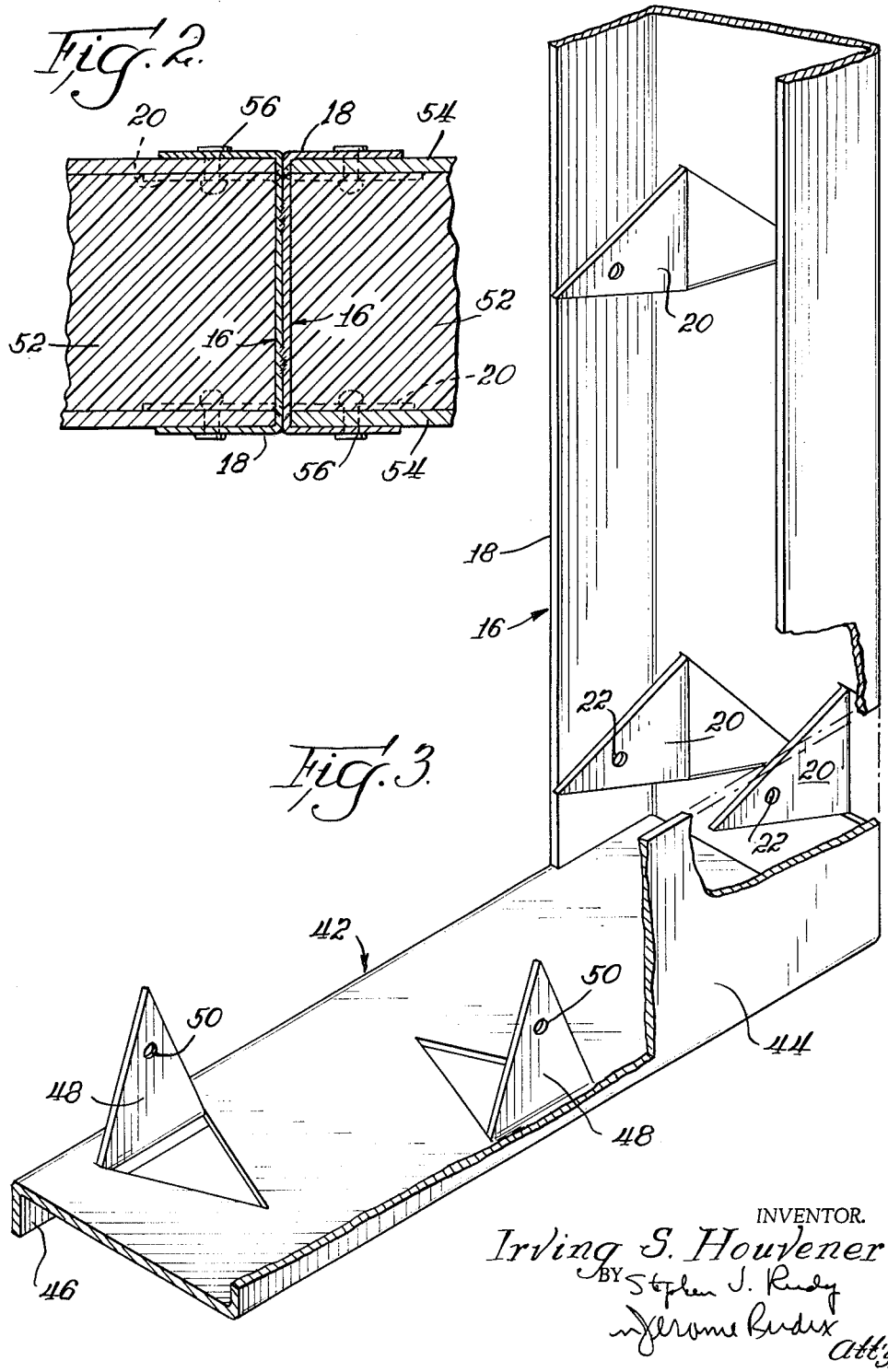

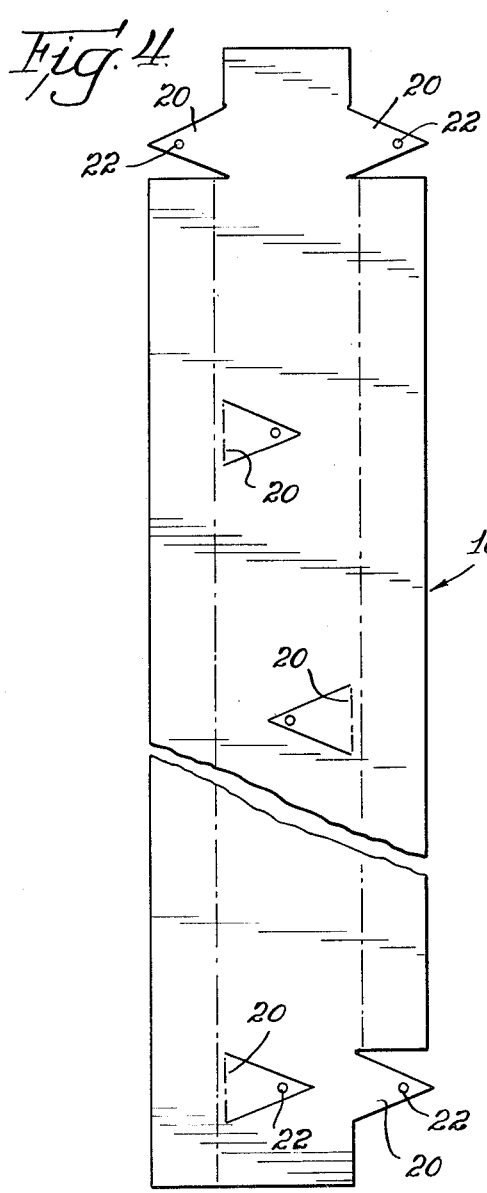
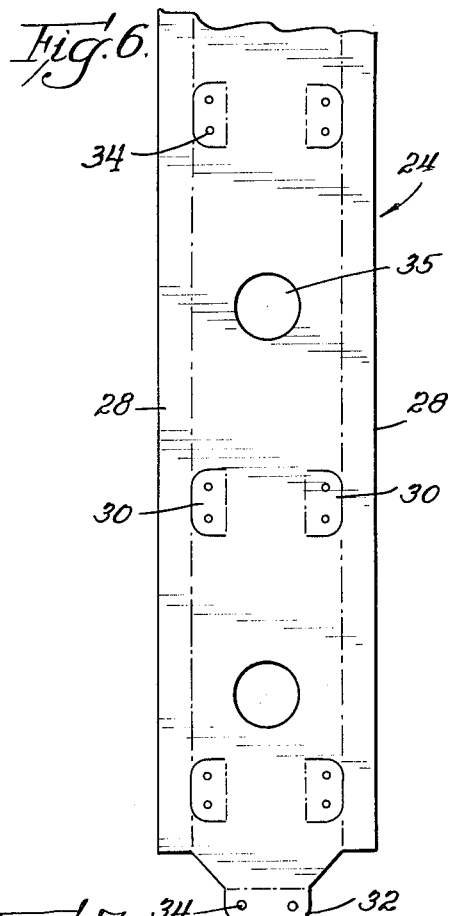
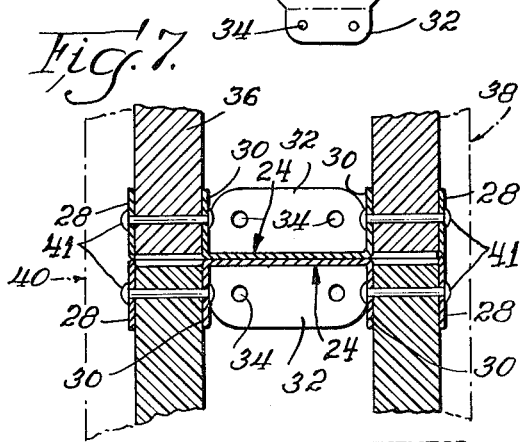
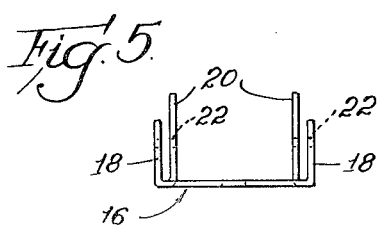

July 27, 1965  I. S. HOUVENER  3,196,499
SANDWICH PANEL FASTENERS
Filed May 21, 1962  5 Sheets-Sheet 5

INVENTOR.
Irving S. Houvener
BY Stephen J. Rudy
Jerome Rudix
Attys.

United States Patent Office
3,196,499
Patented July 27, 1965

3,196,499
SANDWICH PANEL FASTENERS
Irving S. Houvener, Midland, Mich., assignor to The Dow Chemical Company, Midland, Mich., a corporation of Delaware
Filed May 21, 1962, Ser. No. 196,349
1 Claim. (Cl. 20—4)

This invention relates to an improvement in wall structures, and more specifically to a fastener for use in wall structures of the sandwich panel type having a plastic foam interior member.

Similar walls of the prior art have not performed satisfactorily when subjected to intense heat as in fires, because the foamed plastic interior member, generally made of polystyrene or polyurethane, would melt, and the side panels, which depended in part upon the supporting effect of the plastic interior member, would collapse.

The sandwich panel fastener of the subject invention incorporates lateral bracing means, in the form of integral projection members, which hold the outer wall members, or skins, apart so that such collapsing cannot occur. Such lateral bracing means also function as a base for securing pop-rivets in place. In addition, the sandwich panel fastener of the subject invention, may be used in the formation of inner, as well as outer wall structures having interior insulation means. It will be seen that the wall fastener of the invention also contributes to simplified and less costly wall construction, and provides a wall of light weight coupled with high strength.

The main object of this invention is to provide an improvement in wall structures of the plastic foam insulated type.

A more specific object is to provide a wall structure of the sandwich panel type having a plastic foam interior member, wherein the side panels will not collapse in event the supporting effect of the interior member is lost, as by melting under intense heat.

Still another object of the invention is to provide a sandwich panel fastener which may be used in the formation of inner as well as outer wall structures.

A further object of the invention is to provide a panel fastener which contributes to a simplified and less costly wall construction, and which is characterized by being of light weight coupled with high strength.

These and further objects and features of the invention will become more apparent from the following description and accompanying drawings wherein:

FIG. 1 is a fragmentary section view of a building structure having panel assemblies embodying the principles of the invention;

FIG. 2 is a partial section view (enlarged) taken through a vertical joint between two panels and seen along line 2—2 in FIG. 1;

FIG. 3 is a perspective-like view of a panel fastener assemblage useable in the building structure of FIG. 1;

FIG. 4 is an elevation view of a column member useable in the building structure of FIG. 1;

FIG. 5 is an end view of same, after a bending operation;

FIG. 6 is an elevation view of a modified type column member useable in the building structure of FIG. 1;

FIG. 7 is a section view through a column assembly utilizing the column member of FIG. 6;

Figure 8:
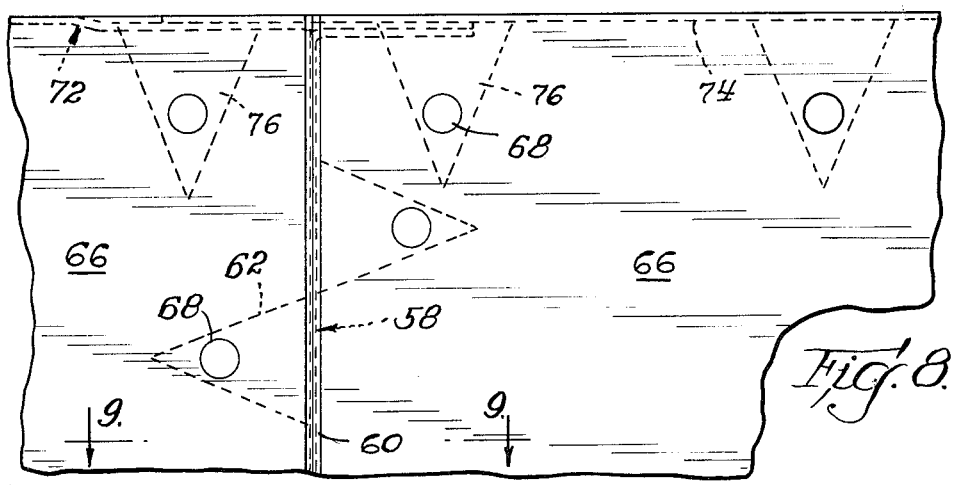
FIG. 8 is a fragmentary elevation view of a sandwich panel utilizing certain fasteners embodying the principles of the invention.

Referring now to the drawings and more particularly to FIG. 4, a column member 16 is shown in development form, i.e., before being bent along longitudinal bend lines to form parallel side walls 18, as seen in FIG. 5. The column member 16 is formed to provide a plurality of triangular projections, or prongs 20, which are alternately arranged in spaced relation along the length of the column member, and a short distance within each side wall 18, as seen in FIG. 5. Each of the triangular prongs 20 is formed by being cut along two sides and then bent upwardly in parallel relation to a side wall 18. The prongs may be fashioned by other methods, such as by welding triangular elements to the column member. Each of the prongs 20 has a hole 22 arranged near the apex thereof for receipt of a fastening means; a hole 22 is likewise formed in a side wall in alignment with a hole in an adjacent prong.

A modified form of column member 24, is shown in development form in FIG. 6, said column member being bendable along longitudinal lines so that the portions 28 form parallel side walls. The column member is formed to provide a plurality of rectangular projections or ears 30 which are arranged in pairs in spaced intervals along the length of the member, said ears being a short distance within and parallel to an adjacent side wall 28. An ear 32 may be arranged at the lower end of the column member and bent at a right angle to the body of the column member; holes 34 may be provided in the ear 32, as well as one or more of the ears 30, if desired. The column member may have holes 35 at spaced intervals along the longitudinal center line.

A pair of column members 24 may be used in a wall assemblage, as shown in FIG. 7. The members 24 are arranged in back-to-back relation with the side walls 28 and ears 30 of one column member extending in opposition to the comparable side walls and ears of the other column member. Wall panels of a plastic foam 36 are positioned in edge-to-edge relation with the ends being maintained between ears 30 and a side wall 28. Wall finish, such as metal lath and plaster (inner wall) 38, or the same combination with a stucco coating (outer wall) 40, may be applied to the wall panels. Rivet means 41 may be used for securing the wall panels in position, as shown.

In FIG. 3, a column member 16 is shown seated upon a base plate 42. Welding, or other means, may be utilized to join the column member to the base plate, if desired. The latter has a side wall 44 extending upwardly along one edge and a side wall 46 extending downwardly along the opposite edge, said walls being in parallel relation. A plurality of projections, or prongs 48, arranged in alternate sequence, extend in spaced intervals along the base plate, in parallel relation to the walls 44 and 46. The prongs 48 are formed in the same manner as the prongs 20 of the column member 16, and have holes 50 arranged therein which are in alignment with holes (not shown) in the side wall 44. The assemblage thus provided forms a framework for a foam plastic interior 52 and side plates 54 (FIG. 1) which may be hardboard, or other material used in wall construction of the general type with which this invention is concerned. The column members 16 may be spot welded in back-to-back relation. Pop-rivets 56, extending through the holes 22 as well as the holes 50, may be used to secure the side plates 54 in position adjacent the prongs 20 and 48 respectively.

Figure 9:
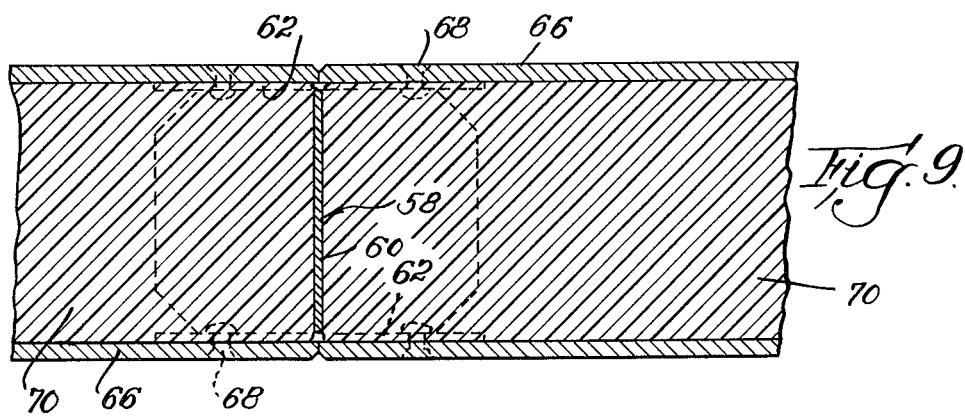
FIG. 9 is a section view generally as seen along line 9—9 in FIG. 8.
Figure 10:
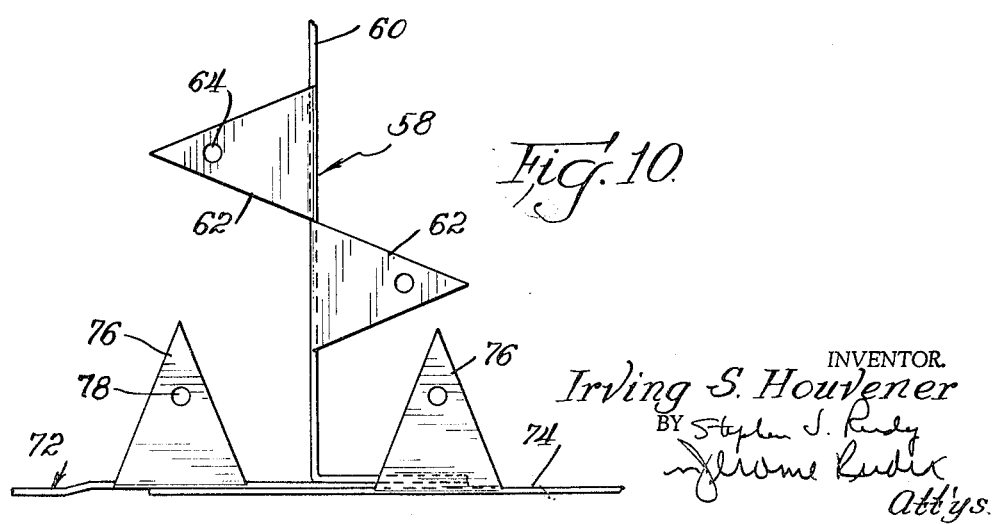
FIG. 10 is a partial elevation view of the fasteners used in FIG. 8.

A further type of fastener element 58, embodying the principles of the invention, is shown in FIGS. 8 to 10. The fastener element 58 differs primarily form those above described, in being devoid of side walls such as walls 18 and 44. Each fastener element 58 includes a flat strip 60 having a plurality of integrally arranged, triangular projections, or prongs 62, positioned along each edge in alternately facing direction, and at right angles to the flat strip. Each prong 62 is provided with a hole 64, whereby said plates 66 may be directly affixed to the prongs by pop-rivets 68. An interior insulating member 70, such as a plastic foam material, may be placed between the side plates 66.

Base and cap plates 72 may be utilized with the fastener elements 58, each of the base plates 72 including a flat strip 74 having a plurality of integrally arranged, triangular projections or prongs 76 positioned along each edge thereof. Each prong 76 is provided with a hole 78, whereby the side plates may be affixed to the prongs by the pop-rivets 68.

Figure 11:
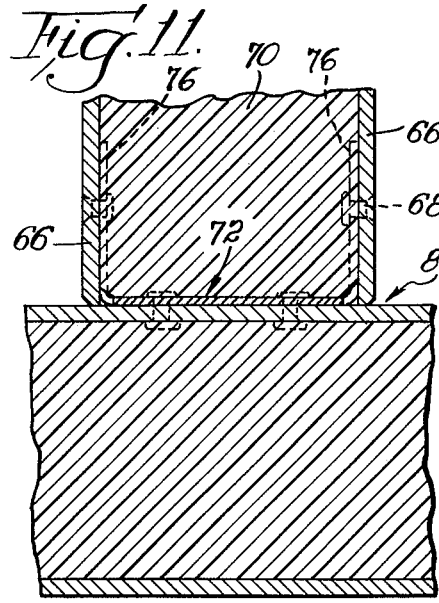
FIGS. 11 to 14 are section views through walls (inside and outside) utilizing panel fasteners made in accordance with the principles of the invention.
Figure 12:
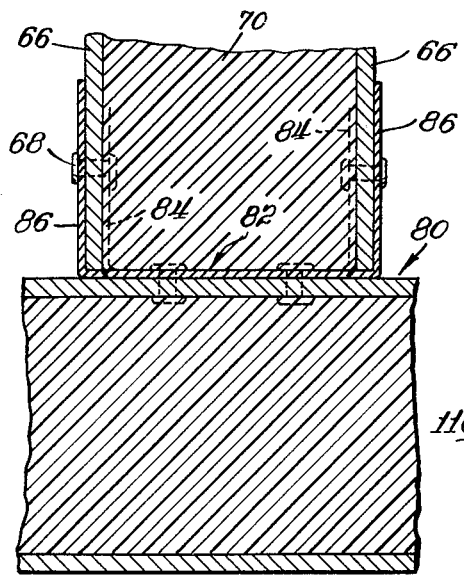

In FIG. 11 a typical wall section, utilizing the fastener elements 58 and base plates 72, is shown as attached or supported upon a floor assemblage 80. A similar wall section is shown in FIG. 12, wherein a base plate 82 is formed of a flat strip having integral projections, or prongs 84, arranged in spaced relation to side walls 86, the base plat 82 being similar to the column member 16 as far as the structural arrangement is concerned.

Figure 13:
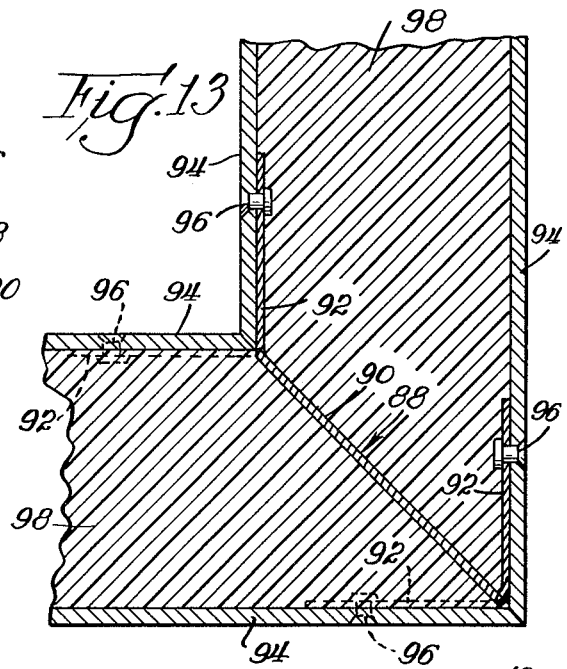
Figure 14:
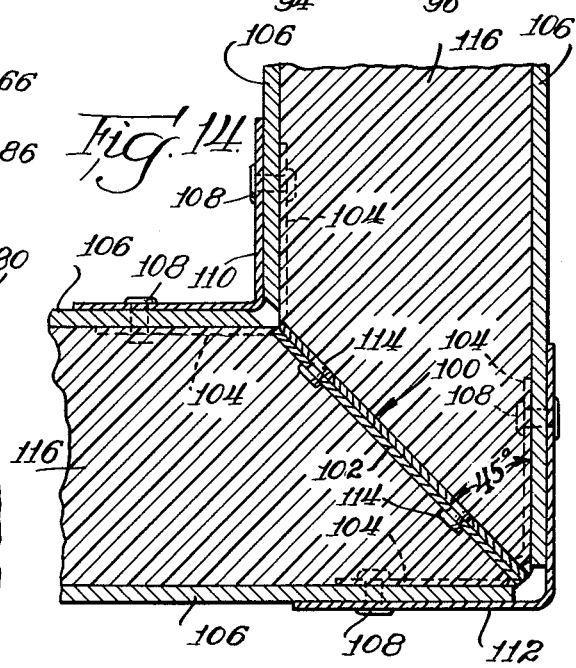

The inventive concept embraces the use of fastener elements in the formation of corner sections, as shown in FIGS. 13 and 14. In FIG. 13, a column member 88 includes a flat portion 90 having a plurality of integral projections, or prongs 92, arranged along both edges thereof, in alternate manner, relative to spacing and direction. The prongs 92 are bent at an angle to the flat portion 90, so that side panels 94 may be secured in parallel relation thereto, as shown. For such purpose, pop-rivets 96 may be utilized. Wall insulating material such as a plastic foam 98, may be arranged between the side panels 94.

The column member arrangement of FIG. 14 includes a pair of column members 100 each of which has a flat portion 102 and a plurality of integral projections, or prongs 104 formed along the edges of the flat portion. The prongs of each column member 100 are in parallel arrangement and extend in a given direction, so that side panels 106 may be affixed to the prongs by pop-rivets 108. Corner plates 110 and 112 may be secured to the inside and outside corners of the corner section, as shown. The column members 100 may be joined by spot welding, or rivet means 114. A plastic foam 116 is arranged between the side panels 106.

Some of the wall sections above described and the manner of installation, are illustrated in FIG. 1. It will be noted that a batten strip 118 may be arranged along the outside lower edge of the side panel 54 when the wall unit shown is used as an outer wall. The base plate 82 is shown when used as a cap piece on a wall section, and the column member 24 is shown when used in ceiling constructions. A roof construction 120 may incorporate fasteners similar to the column members 24, and parallel arranged sheets of plastic foam material 122, with an exterior covering, such as wood shingles 124, or equivalent.

Bracket means 126 and 128, may be used to mount the roof upon the outer wall, as shown.

It will be noted that the prongs serve a dual function of penetrating the foam, in many cases, and also serve as a base for securing pop-rivets in position. It will also be noted that the fasteners add considerable structural strength to the wall panels, and in effect, serve as light metal frames which have, on occasion, provided the basic support for a panel type building.

From the foregoing it will be seen that the various fastener elements disclosed may be utilized to realize the objectives of the invention set forth hereinbefore.

The foregoing description has been given in detail without thought of limitation since the inventive principles involved are capable of assuming other forms without departing from the spirit of the invention or the scope of the following claim.

What is claimed is:

A panel wall structure including in combination, a pair of side plates, a plastic foam insulation member positioned between said pair of side plates, fastener elements arranged about the periphery thereof forming a frame for said panel wall structure including a flat elongated member having side walls along the length thereof, a plurality of integral triangular prongs arranged in spaced parallel relation to each of said side walls and in alternate spaced longitudinal relation relative to one another, said side plates being disposed between one of said side walls and said prongs, respectively, with said prongs being embedded into said plastic foam insulation member to maintain said side plates in spaced parallel relation, said prongs and said side walls being formed to provide holes for the receipt of rivet means extended through said side wall and one of said prongs for securing said fastener means to said panel wall structure.

References Cited by the Examiner

UNITED STATES PATENTS

| | | | |
|---|---|---|---|
| 483,040 | 9/92 | Binet | 20—92 |
| 804,825 | 11/05 | Brooks | 20—92 X |
| 813,253 | 2/06 | Sullivan | 20—92 X |
| 932,197 | 8/09 | Waite | 20—92 X |
| 1,862,831 | 6/32 | Ryan | 50—404 |
| 1,981,240 | 11/34 | McNeil | 189—34 X |
| 1,989,259 | 1/35 | Becker | 189—34 |
| 2,000,243 | 5/35 | Manske | 20—4 |
| 2,075,773 | 3/37 | Vass | 50—437 |
| 2,430,961 | 11/47 | Sprunger | 20—4 |
| 2,730,772 | 1/56 | Jones. | |
| 2,879,560 | 3/59 | Stefan | 20—74 |
| 2,887,732 | 5/59 | Kloote. | |
| 2,937,418 | 5/60 | Sanford | 20—92 |
| 3,125,193 | 3/64 | Brown | 189—34 |

FOREIGN PATENTS 820,209 1951 Germany.
784,319 1957 Great Britain.

JACOB L. NACKENOFF, *Primary Examiner.*
WILLIAM I. MUSHAKE, *Examiner.*